(12) United States Patent
Hesla

(10) Patent No.: US 8,104,543 B2
(45) Date of Patent: Jan. 31, 2012

(54) GAUGE WHEEL FOR USE WITH A CONVENTIONAL ROW PLANTER ASSEMBLY

(76) Inventor: Ron Hesla, Wakonda, SD (US)

( * ) Notice: Subject to any disclaimer, the term of this patent is extended or adjusted under 35 U.S.C. 154(b) by 121 days.

(21) Appl. No.: 11/803,447

(22) Filed: May 15, 2007

(65) Prior Publication Data

US 2008/0066662 A1    Mar. 20, 2008

Related U.S. Application Data

(60) Provisional application No. 60/800,550, filed on May 15, 2006, provisional application No. 60/922,867, filed on Apr. 11, 2007.

(51) Int. Cl.
| | |
|---|---|
| *A01B 19/10* | (2006.01) |
| *A01B 23/00* | (2006.01) |
| *A01B 35/20* | (2006.01) |
| *A01B 39/20* | (2006.01) |
| *A01B 49/04* | (2006.01) |

(52) U.S. Cl. ........ 172/610; 111/137; 111/164; 111/167; 111/195

(58) Field of Classification Search .................. 111/191, 111/193, 195, 135, 137, 167, 164, 163, 157, 111/149; 172/540, 555, 610
See application file for complete search history.

(56) References Cited

U.S. PATENT DOCUMENTS

| | | | | |
|---|---|---|---|---|
| 4,760,806 | A | * | 8/1988 | Bigbee et al. .................. 111/167 |
| 5,431,233 | A | * | 7/1995 | Schmidt ........................ 172/588 |
| 5,483,907 | A | | 1/1996 | Gaalswyk |
| 5,884,711 | A | | 3/1999 | Shoup |
| 5,970,891 | A | * | 10/1999 | Schlagel ........................ 111/135 |
| 7,584,706 | B1 | | 9/2009 | Smith |
| 7,823,521 | B1 | | 11/2010 | Smith |

* cited by examiner

*Primary Examiner* — Christopher J. Novosad
(74) *Attorney, Agent, or Firm* — Pandiscio & Pandiscio

(57) ABSTRACT

A row planter assembly comprising:
a frame;
an opening disk rotatably mounted to the frame; and
a gauge wheel rotatably mounted to the frame and disposed alongside, but spaced from, the opening disk so as to create a narrow gap therebetween;
wherein the gauge wheel comprises at least one opening in the side wall thereof so as to permit soil to pass from the gap located between the opening disk and the gauge wheel to the region outside of the gauge wheel.

12 Claims, 24 Drawing Sheets

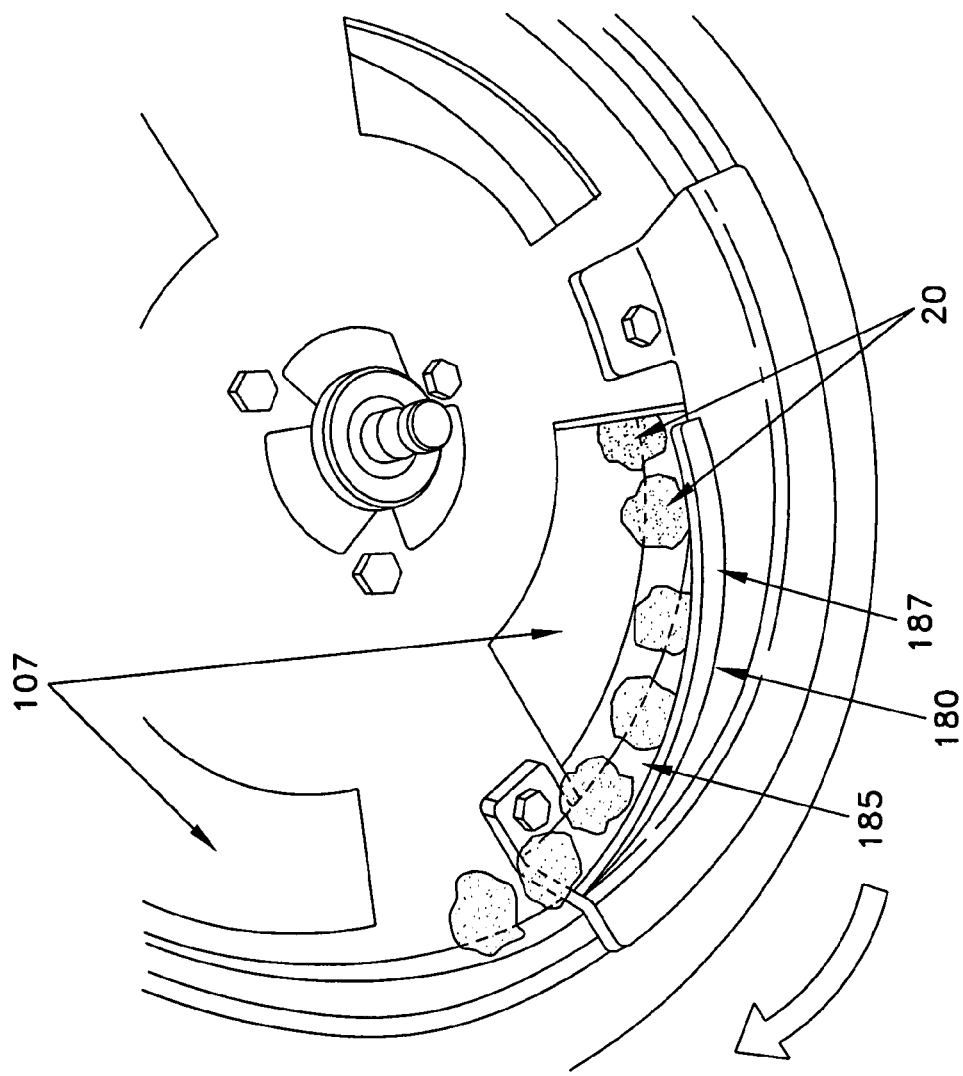

GAUGE WHEEL FOR USE WITH A CONVENTIONAL ROW PLANTER ASSEMBLY

REFERENCE TO PENDING PRIOR PATENT APPLICATIONS

This patent application claims benefit of:

(1) pending prior U.S. Provisional Patent Application Ser. No. 60/800,550, filed May 15, 2006 by Ron Hesla for GAUGE WHEEL FOR USE WITH A CONVENTIONAL ROW PLANTER ASSEMBLY; and (2) pending prior U.S. Provisional Patent Application Ser. No. 60/922,867, filed Apr. 11, 2007 by Ron Hesla for GAUGE WHEEL FOR USE WITH A CONVENTIONAL ROW PLANTER ASSEMBLY.

The two above-identified patent applications are hereby incorporated herein by reference.

FIELD OF THE INVENTION

This invention relates to agricultural machinery in general, and more particularly to a novel gauge wheel for use with a conventional row planter assembly to facilitate planting in adverse conditions.

BACKGROUND OF THE INVENTION

Row planter assemblies are designed to plant rows in an agricultural field, with a plurality of parallel rows being planted with each pass of the row planter assembly. More particularly, with the row planter assembly, for each row, a unit opens a furrow in the soil, distributes the seed into the furrow, and then closes the furrow by pushing soil back over the seed.

The row planter assemblies have a plurality of the aforementioned units, one for each row being planted. Each unit has four main components: (i) a pair of gauge wheels which support the unit on the soil being planted and which regulate the depth of the seed furrow; (ii) a pair of opening discs (sometimes referred to as a "double disk opener") set at an angle to one another for opening the furrow in the soil, with the depth of the opening disks being set relative to the gauge wheels; (iii) a planter for distributing seeds in the open furrow; and (iv) a pair of closing wheels set at an angle to one another for pushing the soil back over the seeds.

More particularly, and looking now at FIGS. 1-5, there is shown a row planter assembly 1. Planter assembly 1 generally comprises a pair of gauge wheels 5 which support the frame 15 of the row planter assembly 1 on the soil. The two disks 10 of the double disk opener are carried by frame 15 of row planter assembly 1, with the two disks 10 of the double disk opener being configured in the shape of a V. The depth of the opening disks 10 protrude below the depth of the gauge wheels 5 and, as a result, when the unit is moved across the soil 20, the opening disks 10 form a furrow 25 in the soil. The gauge wheels 5 are positioned on either side of the opening disks 10, in close lateral proximity, and by virtue of their adjustable connection to frame 15, set the depth of the opening disks 10 (i.e., the depth of penetration of the opening disks 10 into the soil 20). A planter 30 (e.g., a seed tube) is spaced just back from the opening disks 10 of the double disk opener and serves to deposit seeds into the opened furrow 25. The closing wheels 35 are positioned at the back end of the unit, and comprise a pair of angled wheels which close the soil 20 back over the deposited seeds.

As noted above, in order to properly set the depth of the opening disks 10 (i.e., the depth of penetration of the opening disks 10 into the soil 20), it is important for the gauge wheels 5 to be set in close lateral proximity to the opening disks 10. In relatively dry soil conditions, this does not present a significant problem, since the dry soil can move easily through the gap (i.e., the intervening space) between the opening disks 10 and the gauge wheels 5. However, in wet soil conditions, the soil is "sticky" (in the sense that it tends to bind to itself) and there is a significant problem with soil building up on the outsides of the opening disks 10 and the insides of the gauge wheels 5. To this end, a scraper 40 is typically provided to scrape dirt off the face of opening disk 10. However, when the soil is sticky, soil scraped off the face of opening disk 10 still builds up between the opening disk 10 and the inside of the gauge wheel 5. Thus, the gap between the opening disks 10 and the gauge wheels 5 can become plugged with mud, which prevents the opening disks 10 and gauge wheels 5 from rotating on their axles. When the gauge wheels 5 stop rotating on their axles, the gauge wheels 5 tend to "drag" across the soil, so that the gauge wheels 5 can no longer reliably set the depth of the furrow 25. Among other things, when the gauge wheels 5 get plugged with soil in the foregoing manner, the gauge wheels tend to skid across the top of the soil, destroying the seed furrow 25, so that seed is left on top of the ground rather than deposited into a furrow. In this respect it should be appreciated that the depth of the furrow 25 is frequently quite important for proper crop growth. When the gauge wheels 5 stop rotating so that they can no longer accurately set furrow depth, the farmer must interrupt the planting operation, climb down from the tractor, manually remove the mud from the space between the opening disks 10 and the gauge wheels 5, climb back up onto the tractor and resume planting—until the machinery clogs once again, in which case the planting operation must be halted once more while the machinery is cleaned in the foregoing manner.

Planting in wet conditions, using conventional row planter assemblies, is extremely time-consuming and labor intensive. For example, if the operator of the planter assembly is required to stop the machinery approximately every ten minutes and spend approximately five minutes cleaning the gap between the opening disks 10 and the gauge wheels 5, productivity is reduced by 33%. Furthermore, operator fatigue is significantly increased, due to the additional exertion of climbing down from the tractor, manually cleaning the space between the opening disks 10 and the gauge wheels 5 and climbing back up into the tractor to resume planting. This loss of productivity and increase in operator fatigue are significant problems, particularly in certain climates, and/or for certain crops, one or both of which may have very limited planting periods.

Various efforts have been made in an effort to keep the gauge wheel free of soil build-up. Many of these approaches incorporate the use of scrapers for scraping soil build-up off of the opening disks. However, this type of solution is not entirely satisfactory, since in many cases the scrapers merely push the wet soil off of the opening disks and onto the gauge wheel. This problem can be further complicated due to the presence of various attachment arms for holding various parts to the planter chassis.

SUMMARY OF THE INVENTION

It is, therefore, one object of the present invention to provide an improved gauge wheel for use with a conventional row planter assembly, wherein the improved gauge wheel facilitates the egress of soil (particularly sticky wet soil) from the gap located between the opening disk and the gauge wheel.

Another object of the present invention is to provide an improved row planter assembly which utilizes the aforementioned improved gauge wheels so as to be less susceptible to clogging due to wet soil conditions.

These and other objects are addressed by the present invention, which comprises the provision and use of a novel gauge wheel which prevents a buildup of soil in the gap between the opening disk and the gauge wheel. More particularly, the novel gauge wheel comprises at least one opening formed in the face of the gauge wheel which permits soil to exit the gap between the opening disk and the gauge wheel. As a result of this construction, soil does not build up in the gap between the opening disk and the gauge wheel, the gauge wheels continue to rotate freely, and the depth of the opening disks are properly maintained, whereby planting may continue without interruption, even in wet soil conditions.

In one preferred form of the present invention, there is provided a row planter assembly comprising:

a frame;

an opening disk rotatably mounted to the frame; and a gauge wheel rotatably mounted to the frame and disposed alongside, but spaced from, the opening disk so as to create a narrow gap therebetween;

wherein the gauge wheel comprises at least one opening in the side wall thereof so as to permit soil to pass from the gap located between the opening disk and the gauge wheel to the region outside of the gauge wheel.

In another preferred form of the invention, there is provided a row planter assembly comprising:

a frame;

an opening disk rotatably mounted to the frame;

a gauge wheel rotatably mounted to the frame and disposed alongside, but spaced from, the opening disk so as to create a narrow gap therebetween, wherein the gauge wheel comprises at least one opening in the side wall thereof so as to permit soil to pass from the gap located between the opening disk and the gauge wheel to the region outside of the gauge wheel;

a scraper disposed in the gap between the opening disk and the gauge wheel and configured to remove soil from at least one of the opening disk and the gauge wheel and direct the removed soil out the at least one opening, and further wherein the scraper comprises a first surface for removing soil from the opening disk, a second surface for removing soil from the gauge wheel, and a curved body for directing the removed soil out the at least one opening in the gauge wheel;

at least one wheel liner disposed adjacent to the at least one opening in the gauge wheel, wherein the wheel liner comprises an inner rim surface to facilitate the egress of soil out the at least one opening;

at least one soil deflector disposed adjacent to the at least one opening in the gauge wheel, wherein the soil deflector is positioned along a trailing edge of the at least one opening so as to facilitate the egress of soil out the at least one opening; and at least one soil exit chute disposed adjacent to the at least one opening in the gauge wheel, wherein the soil exit chute comprises a floor and a side wall configured to move soil outboard as it emerges from the at least one opening.

BRIEF DESCRIPTION OF THE DRAWINGS

These and other objects and features of the present invention will be more fully disclosed or rendered obvious by the following detailed description of the preferred embodiments of the invention, which are to be considered together with the accompanying drawings wherein like numbers refer to like parts and further wherein:

FIG. 24 is a perspective view showing another form of liner formed in accordance with the present invention.

DETAILED DESCRIPTION OF THE PRESENT INVENTION

Figure 8:
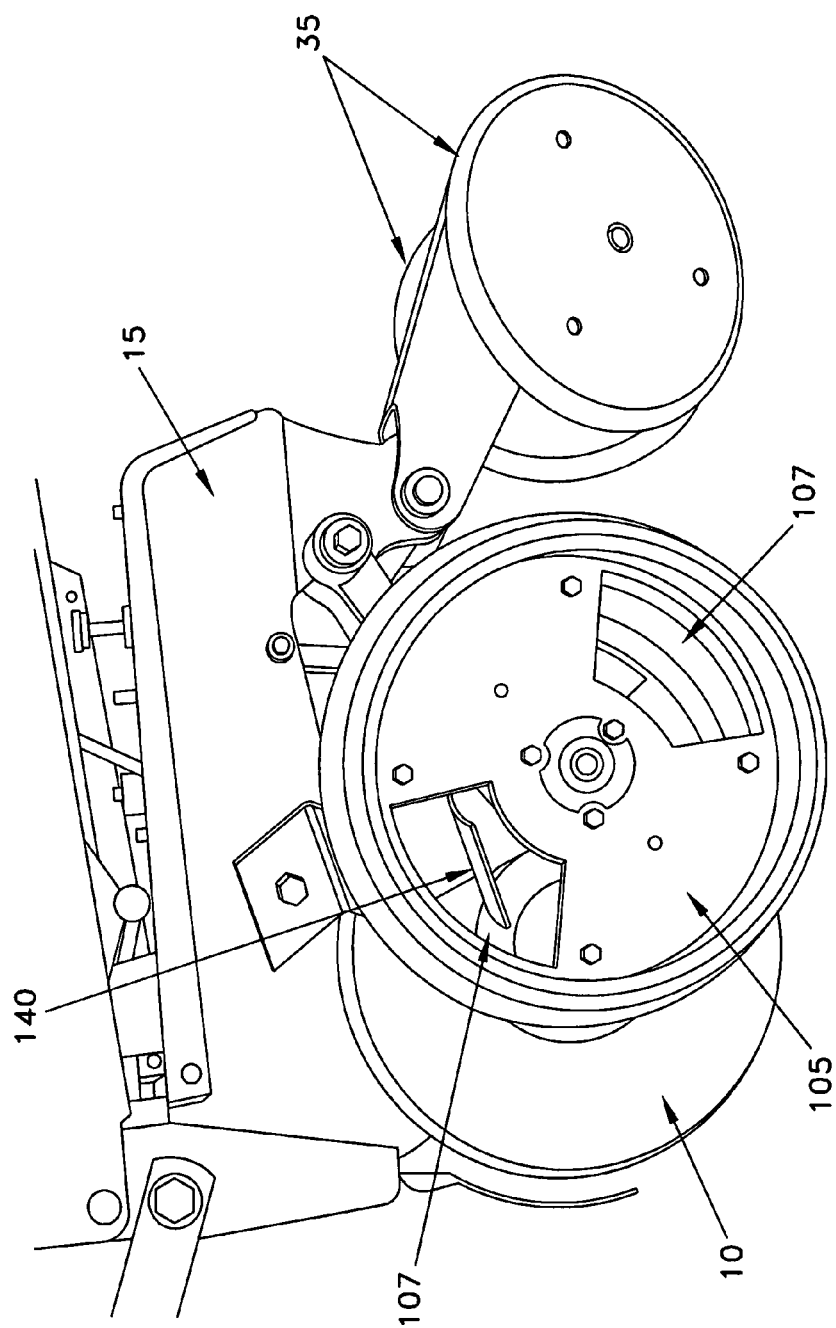
FIG. 8 is a perspective view showing a novel gauge wheel formed in accordance with the present invention, and also showing an opening disk, scraper and closing disks.
Figure 9:
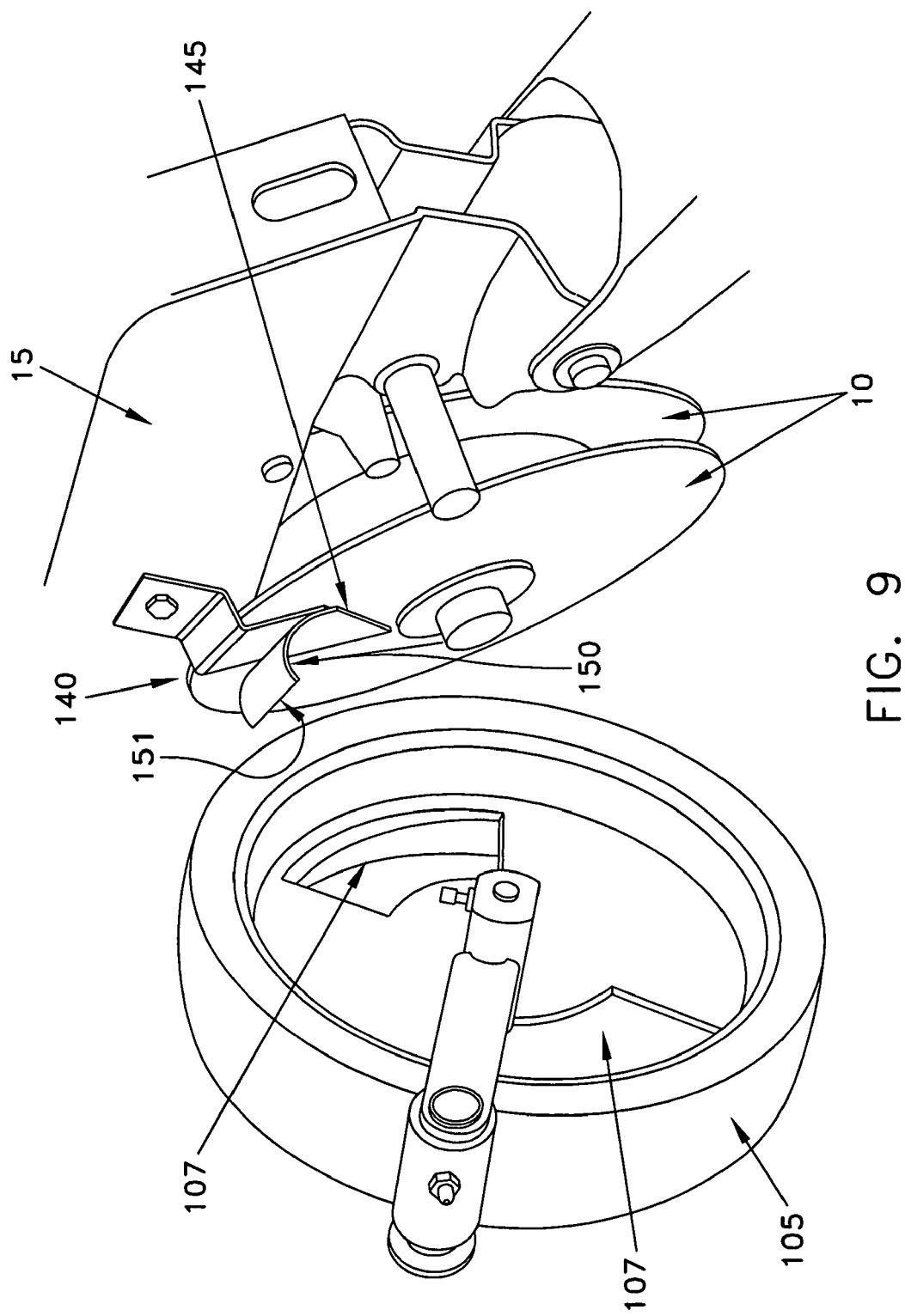
FIG. 9 is an exploded view showing a novel gauge wheel formed in accordance with the present invention, and also showing an opening disk, scraper and closing disks.
Figure 10:
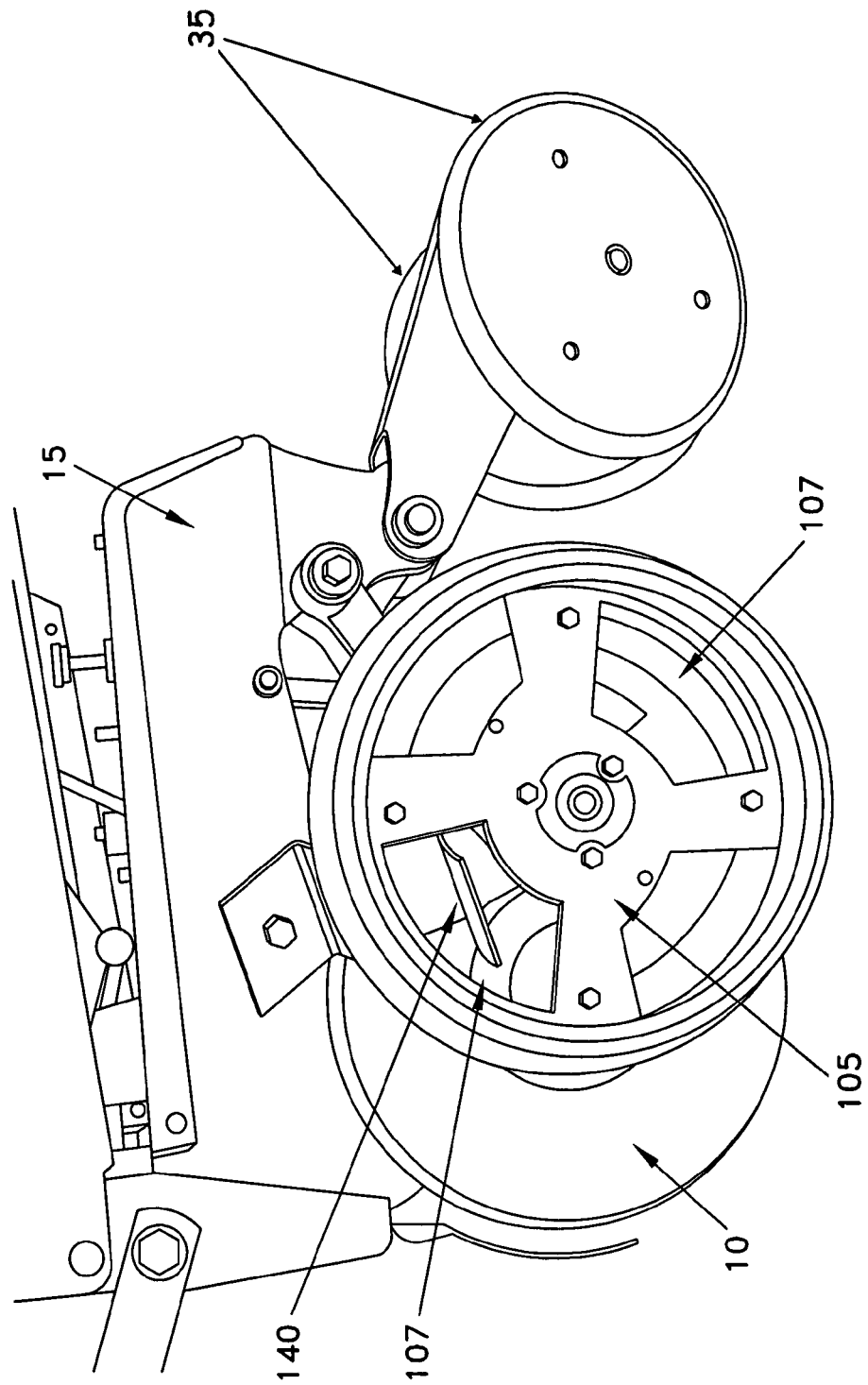
FIG. 10 is a perspective view showing an alternative form of a gauge wheel also formed in accordance with the present invention.
Figure 11:
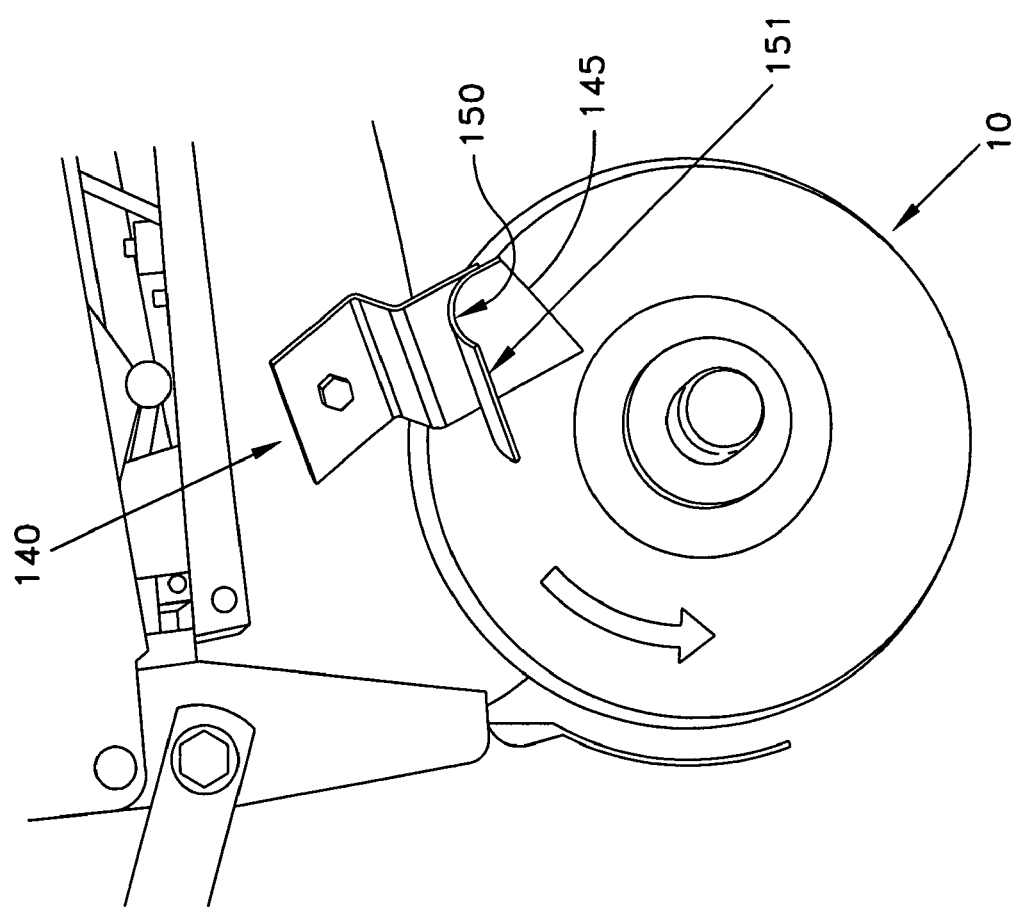
FIG. 11 is a perspective view showing a novel form of scraper also formed in accordance with the present invention.
Figure 12:
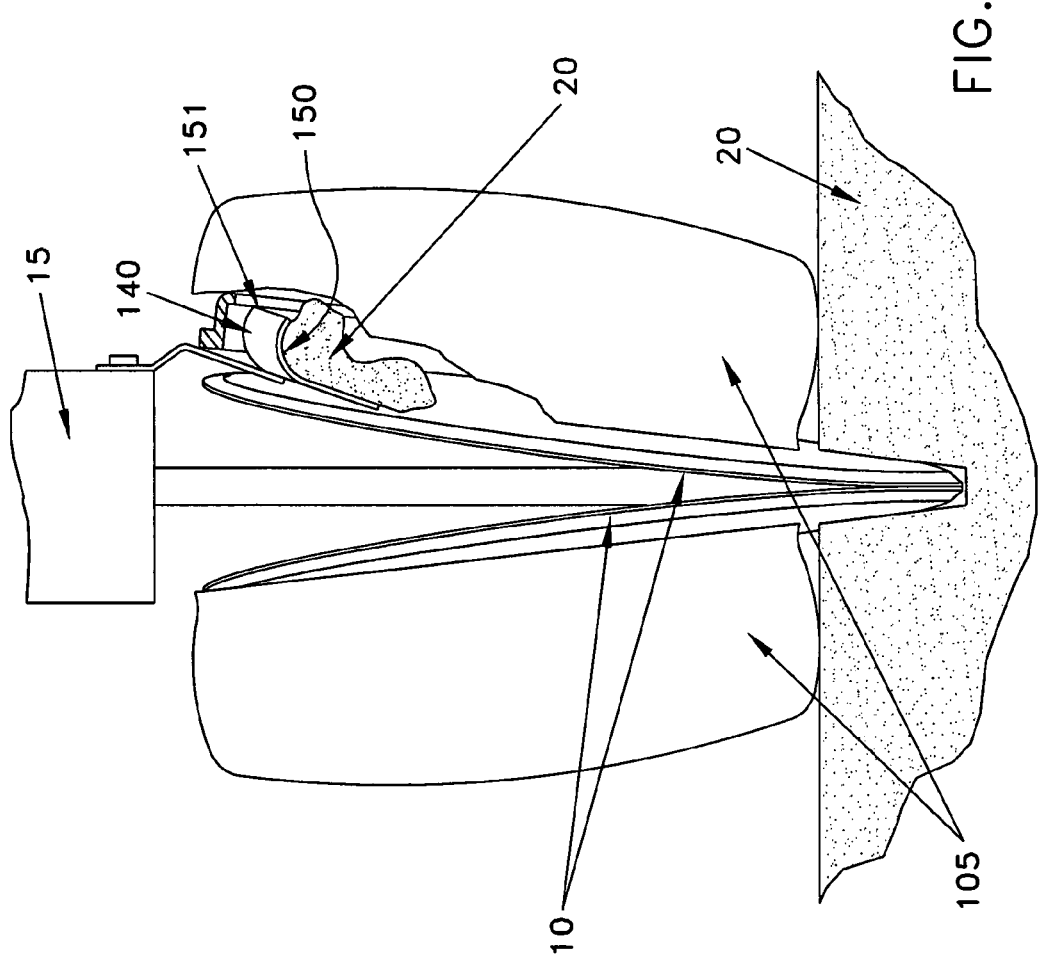
FIG. 12 is a front view showing the scraper of FIG. 11 removing soil from the outside face of the opening disk.
Figure 13:
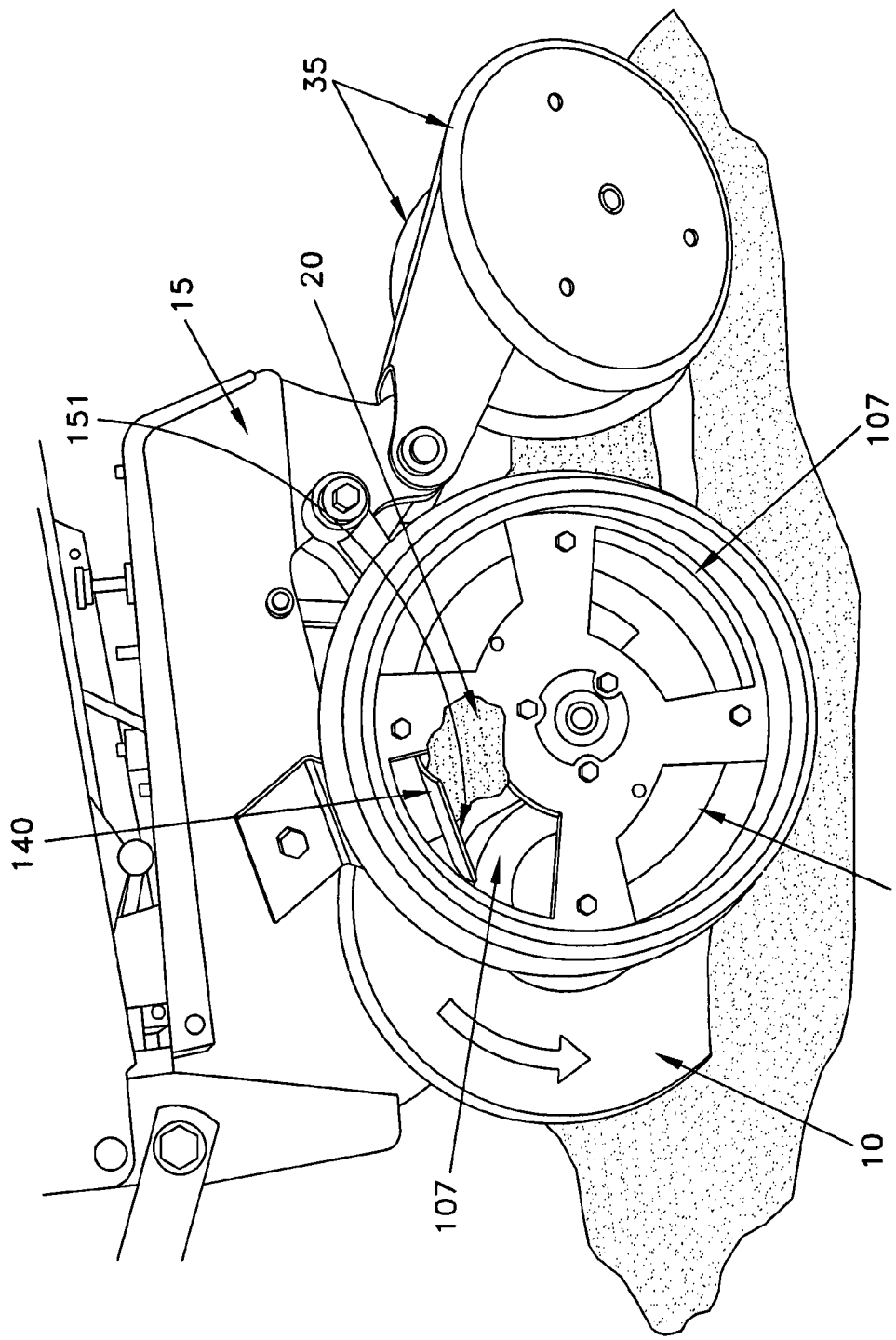
FIG. 13 is a perspective view showing soil exiting an opening in a gauge wheel formed in accordance with the present invention.

Looking first at FIGS. 8 and 9, the present invention generally comprises the provision and use of a novel gauge wheel 105 which prevents a buildup of soil in the gap between the opening disk 10 and the gauge wheel. More particularly, the novel gauge wheel 105 comprises at least one opening 107 formed in the face of the gauge wheel which permits soil to exit the gap between the opening disk 10 and the gauge wheel 105. As a result of this construction, soil does not build up in the gap between the opening disk 10 and the gauge wheel 105, the gauge wheels 105 continue to rotate freely, and the depth of the opening disks 10 are properly maintained, whereby planting may continue without interruption, even in wet soil conditions.

In one preferred construction, and still looking now at FIGS. 8 and 9, gauge wheel 105 comprises a pair of diametrically-opposed openings 107, with the openings extending along a substantial portion (e.g., greater than about 30%) of the radius of the gauge wheel.

And in a preferred construction, each of the openings 107 extends along a substantial arc (e.g., greater than about 50 degrees) of the circumference of the gauge wheel.

Of course, it will be appreciated that the number, size and disposition of the openings 107 may vary. In general, openings 107 are sufficient in number, size and disposition to permit soil to exit the gap located between the opening disk 10 and the gauge wheel 105, so as to keep soil from building up in this region and causing gauge wheel 105 to bind. However, it will also be appreciated that sufficient material must be maintained within the face of gauge wheel 105 so as to ensure sufficient wheel integrity to support the weight of the row planter assembly.

In addition to the foregoing, the portions of gauge wheel 105 forming the perimeters of the opening 107 may have various configurations, e.g., the surface edges of the openings may be tapered to facilitate egress of soil through the openings, the corners of openings 107 may be radiused, etc.

Furthermore, it will be appreciated that gauge wheel 105 may be formed out of any suitable material or materials, e.g., the entire gauge wheel 105 may be formed out of a suitable metal, a suitable plastic, etc.; or the gauge wheel 105 may be formed out of two or more materials, e.g., a metal inner rim and a plastic outer rim, etc.

Preferably, a scraper 40 is still used in conjunction with the novel gauge wheel 105. In this situation, the scraper 40 may actually assist, or may be modified to further assist, in directing the loosened soil through the at least one opening 107 in the face of the gauge wheel 105 as the gauge wheel turns.

It will be appreciated that numerous benefits are obtained by using the novel gauge wheel design of the present invention. First and foremost, the one or more openings 107 formed in gauge wheel 105 facilitate egress of soil from the gap between the opening disks 10 and the gauge wheels 105. As a result, productivity is increased by allowing more time to be spent planting and less time unplugging clogged planter row units. This in turn permits the farmer to plant more acres in less time, with less fatigue, thereby increasing planting efficiency, particularly in wet soil conditions.

In addition to the foregoing, the one or more openings 107 in gauge wheel 105:

(i) provide an easy way to examine the row planter assembly's opening disks (particularly their hubs and bearings), scrapers, seed deployment tubes, etc.;

(ii) provide a visual cue of gauge wheel rotation;

(iii) reduce the total amount of material used to produce the gauge wheel; and (iv) provide increased tolerance for the gap between the opening disks and the gauge wheels, thereby minimizing the time spent to adjust gauge wheel position.

Significantly, the present invention may be retroactively installed on existing row planter assemblies as well as used in new row planter assemblies.

And the present invention may be used on other farm equipment such as planting drills, etc.

And the present invention may be used with virtually any type of seed planting.

Novel Scraper

Figure 1:
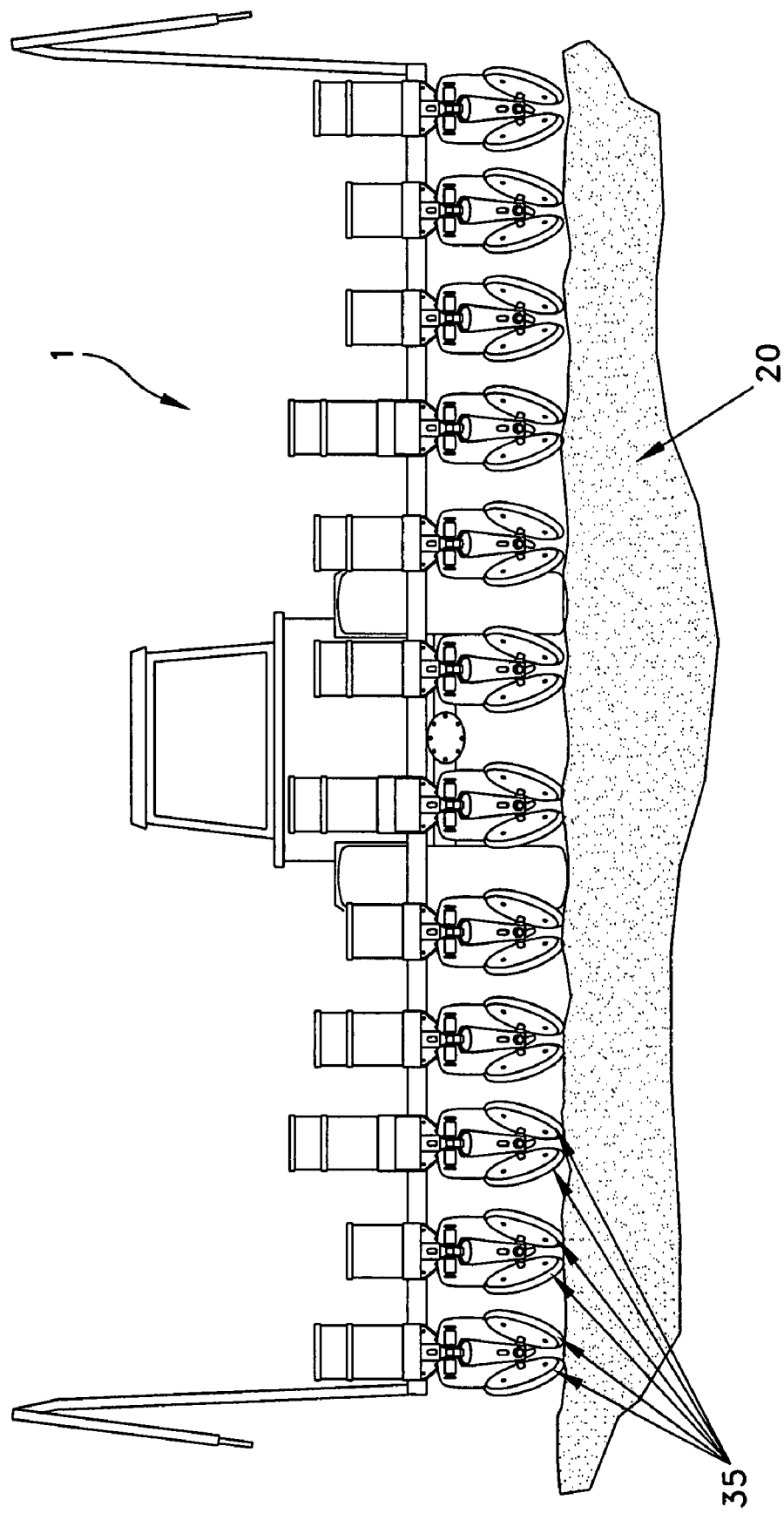
FIG. 1 is a rear view showing a prior art row planter assembly.
Figure 2:
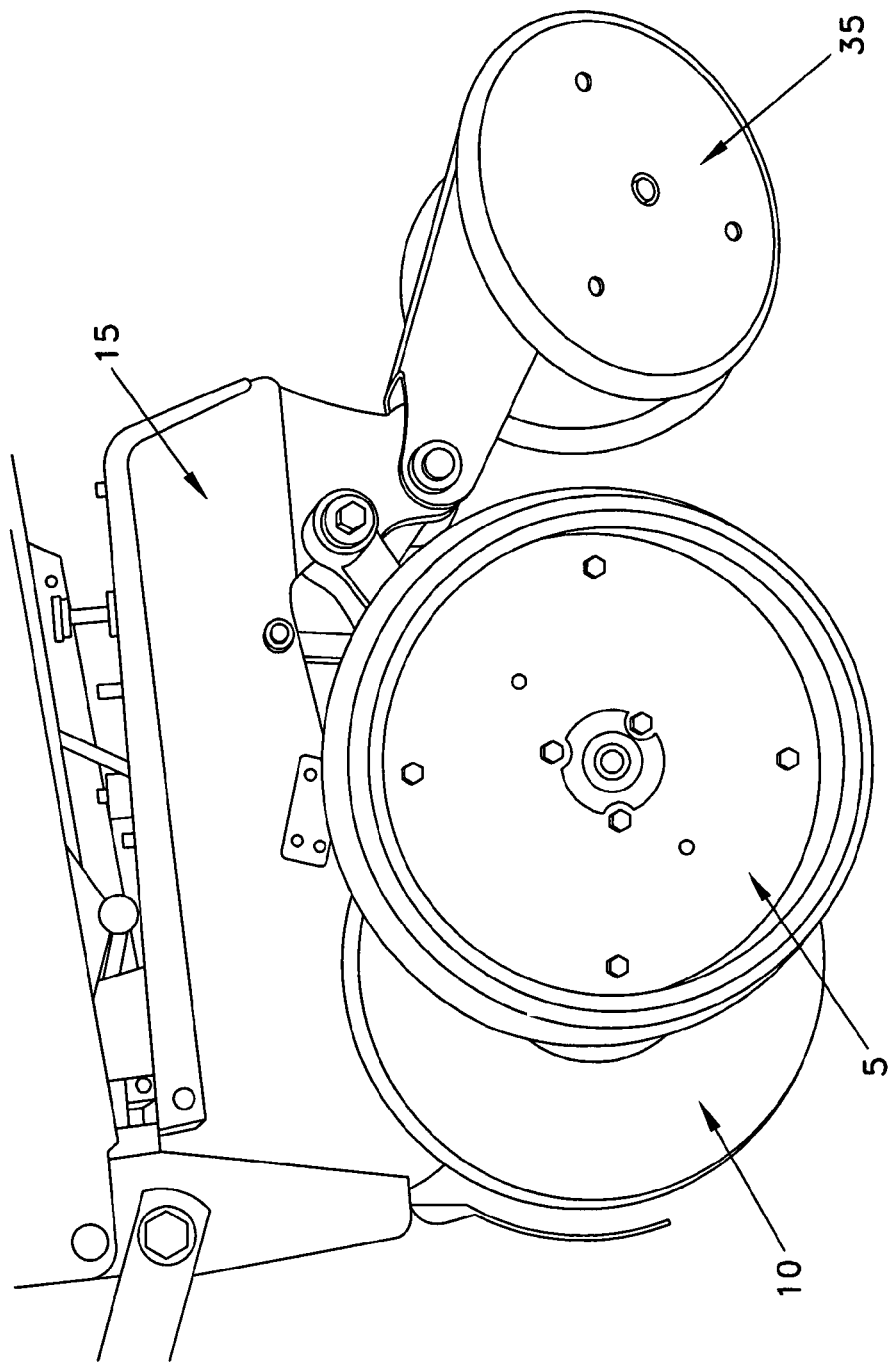
FIG. 2 is a perspective view showing a prior art opening disk, gauge wheel and closing disks of a row planter assembly.
Figure 3:
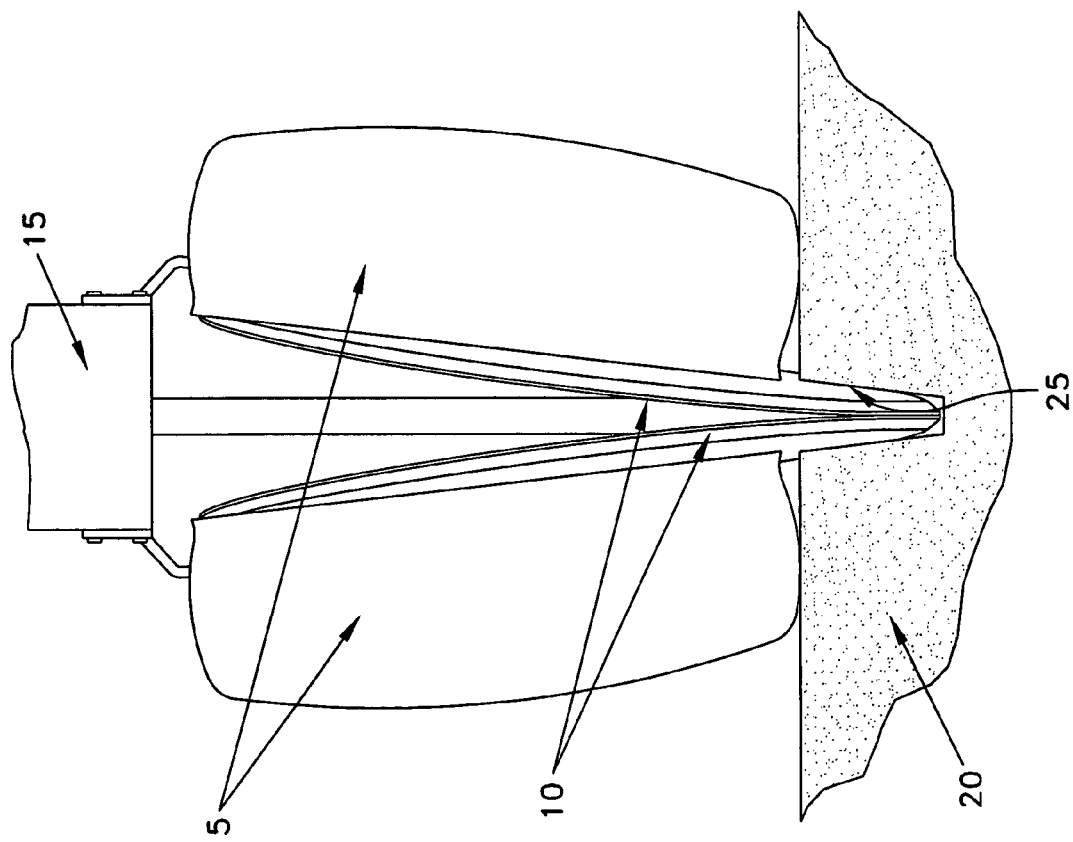
FIG. 3 is a front view showing prior art opening disks and gauge wheels of a row planter assembly.
Figure 4:
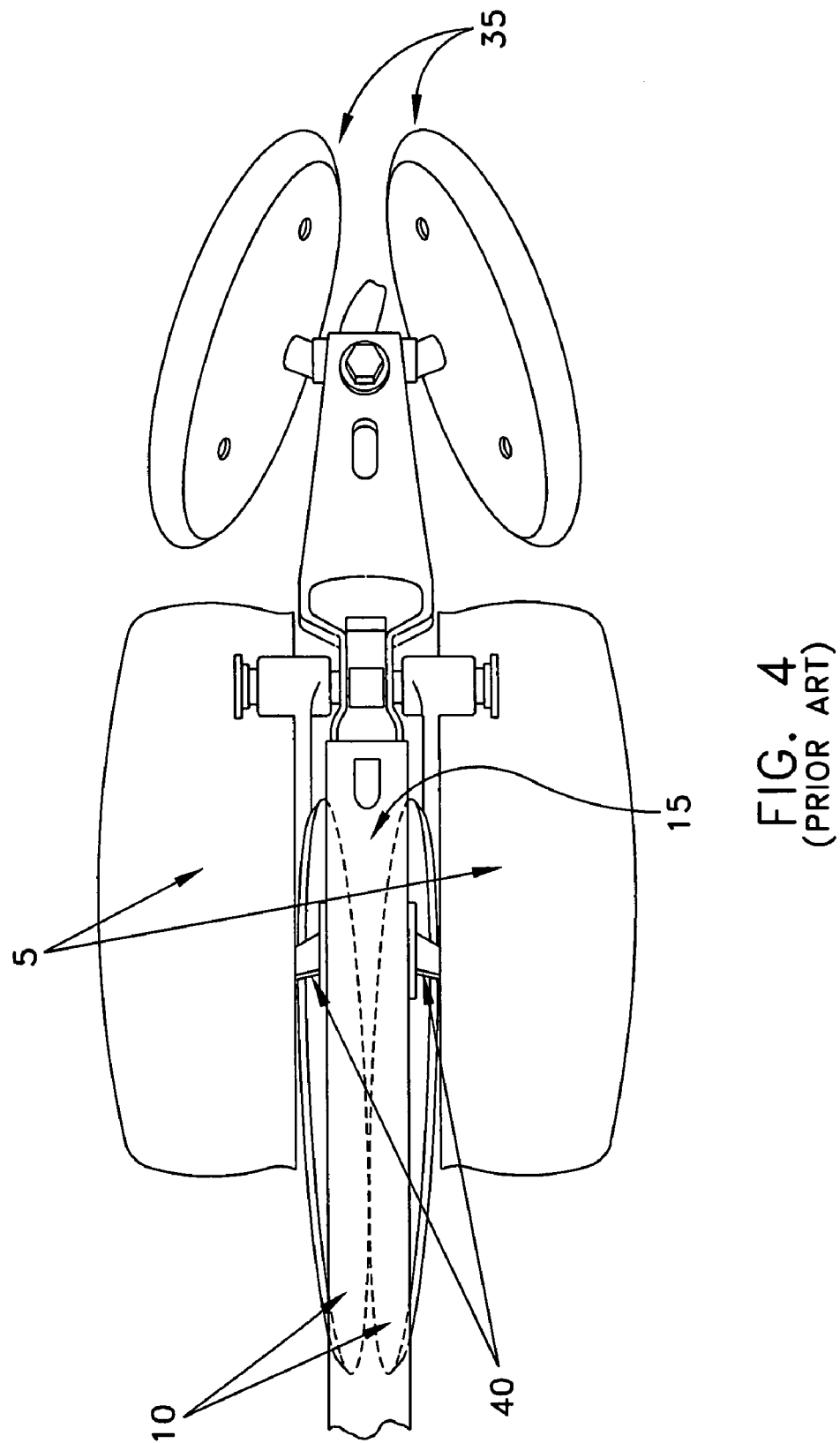
FIG. 4 is a top view showing prior art opening disks, scrapers, gauge wheels and closing disks of a row planter assembly.
Figure 5:
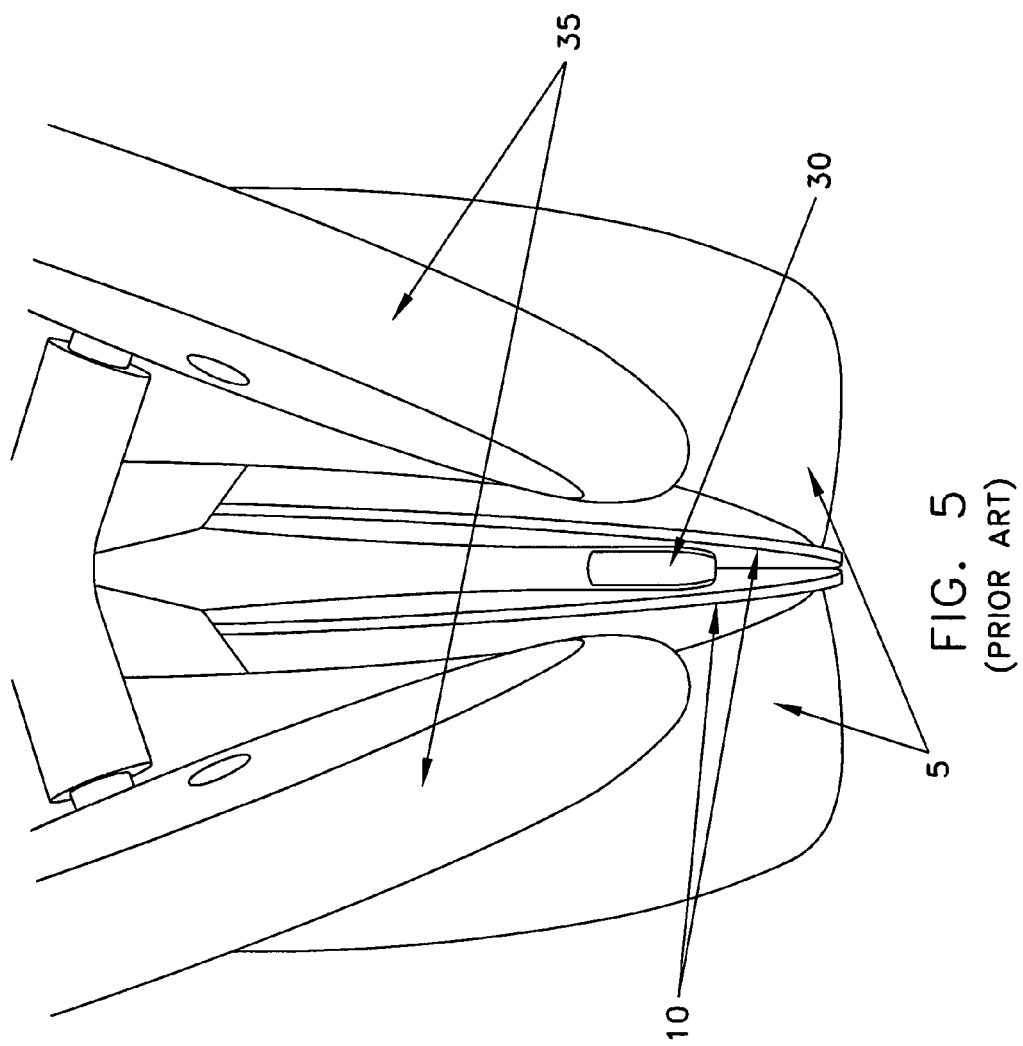
FIG. 5 is a rear view showing prior art opening disks, gauge wheels, seed tube and closing wheels of a row planter assembly.
Figure 6:
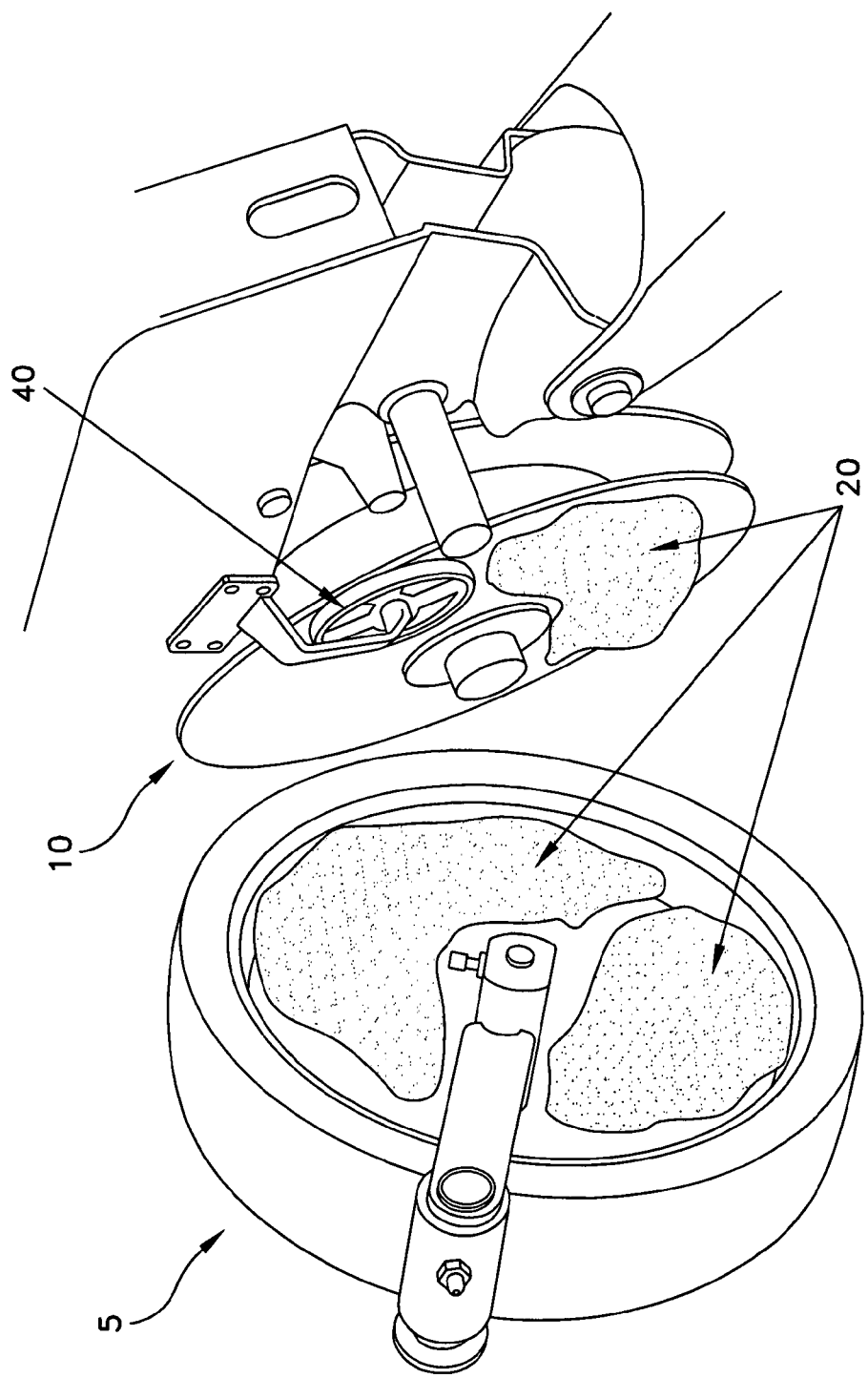
FIG. 6 is an exploded view of a prior art gauge wheel, scraper and opening disks of a row planter assembly, with soil shown adhering to the outside face of the opening disk and the inside face of the gauge wheel.
Figure 7:
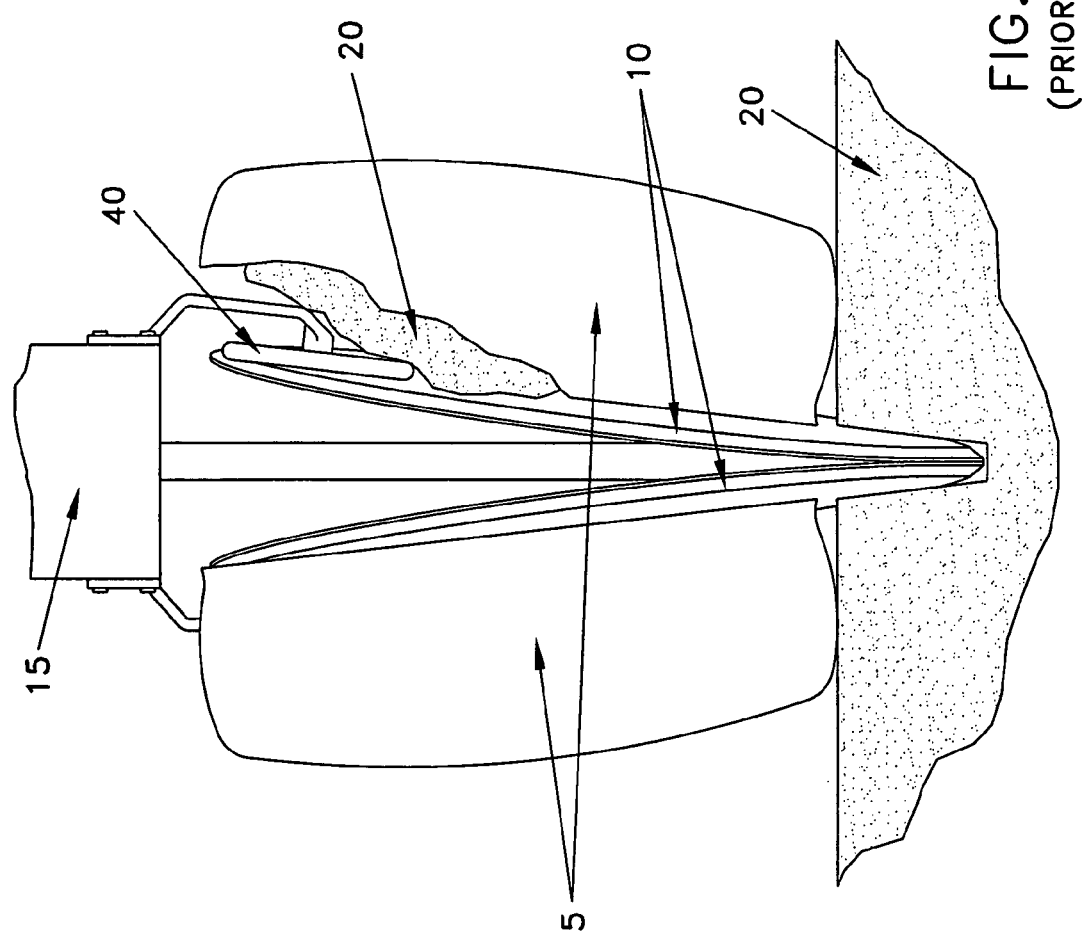
FIG. 7 illustrates prior art opening disks, scrapers and gauge wheels of a row planter assembly, with soil shown lodged in the gap between the opening disk and the gauge wheel.

The prior art scraper 40 shown in FIG. 6 essentially comprises a wheel which contacts the face of opening disk 10. While prior art scraper 40 works well with the novel gauge wheel 105, with the loosened soil being free to exit the gap located between opening disk 10 and gauge wheel 105 via openings 107, the present invention performs better with the provision of a novel scraper 140.

Thus, for example, and looking now at FIGS. 8-13, there is shown the novel scraper 140. Novel scraper 140 serves to remove accumulated soil from the face of opening disk 10 and/or the rim of gauge wheel 105 and direct that loosened soil out of openings 107 of the gauge wheel 105. To this end, novel scraper 140 comprises (i) a flat leading edge 145 for engaging the side wall of the opening disk 10 and freeing the built-up soil from the opening disk, and (ii) a curved body 150 for channeling the scraped-off soil toward the openings 107 in gauge wheel 105, so as to facilitate egress of soil from the space between the opening disk and gauge wheel. Curved body 150 also includes a trailing edge 151 for removing any accumulated soil from the rim of gauge wheel 105 and channel that loosened soil out openings 107.

Thus, it will be seen that novel scraper 140 provides one edge 145 for removing accumulated soil from opening disk 10, another edge 151 for removing accumulated soil from gauge wheel 105, and a curved body 150 located between edges 145 and 151 for guiding loosened soil out openings 107.

Universal Scraper Arm

In the construction shown in FIGS. 8-13, scraper 140 is shown mounted to the chassis 15 of the row planter assembly. This is analogous to the manner in which the prior art scraper 40 is mounted to the chassis 15 of the row planter assembly.

In an alternative form of the present invention, scraper 140 is supported adjacent to the opening disc 10 using a universal scraper arm. This universal scraper arm permits the scraper 140 to be properly positioned when using any of the commercially-available opening disks. This universal scraper arm may be mounted to the axle of opening disk 10, or the universal scraper arm may be mounted to the axle of gauge wheel 105.

Figure 14:
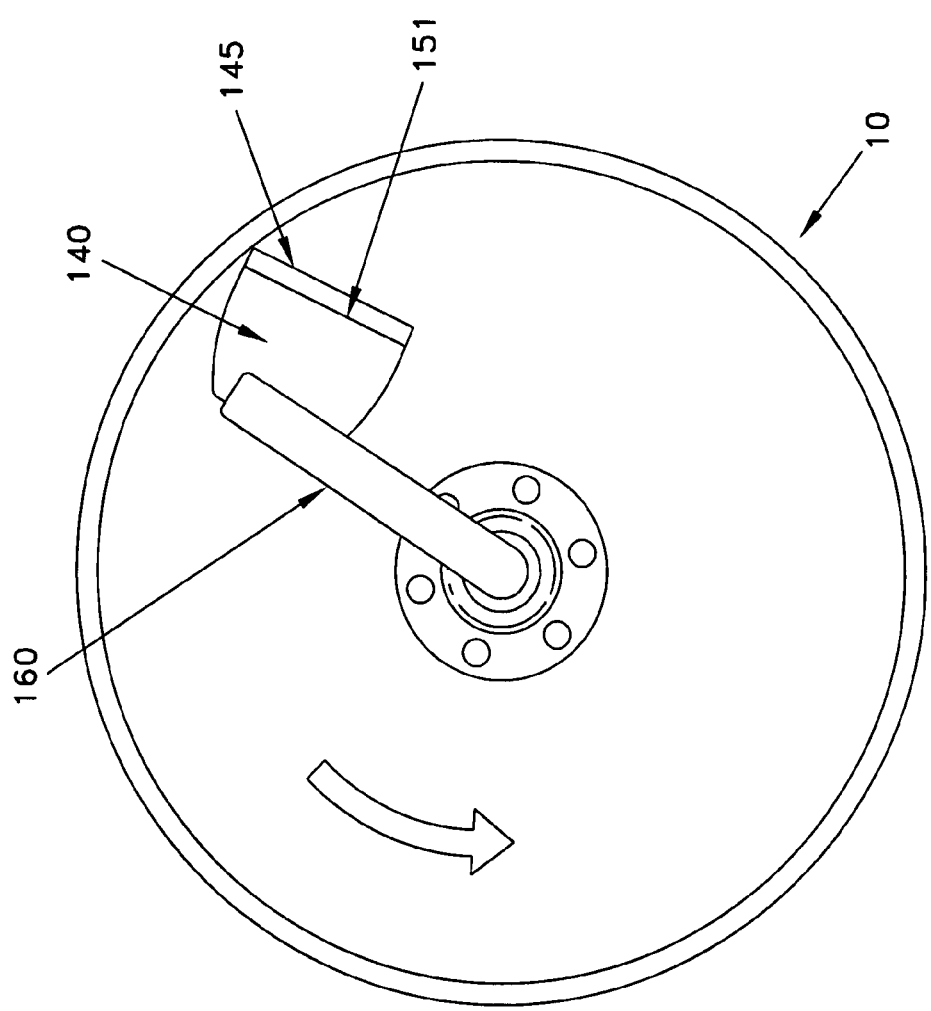
FIG. 14 is a side view showing an alternative approach for mounting the scraper adjacent the opening disk.
Figure 15:
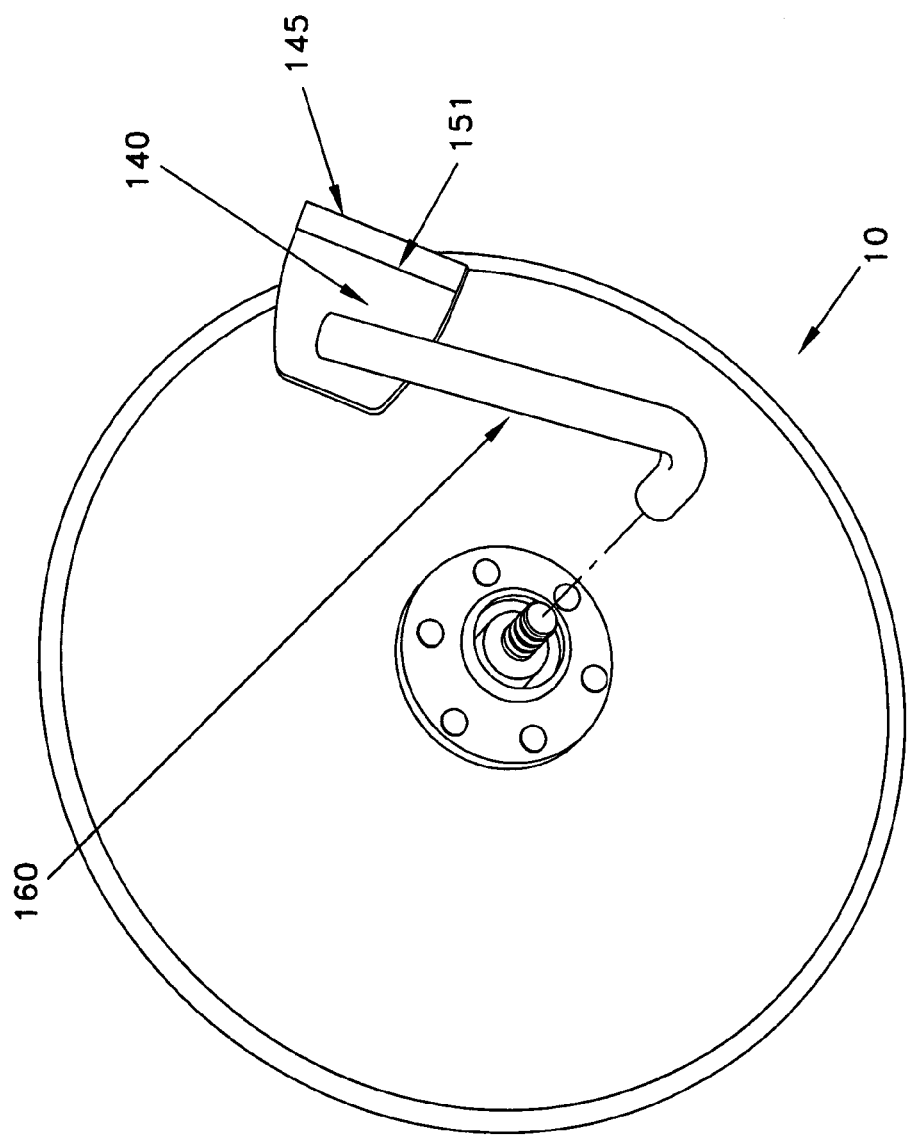
FIG. 15 is a side view showing one way of effecting the construction shown in FIG. 14.
Figure 16:
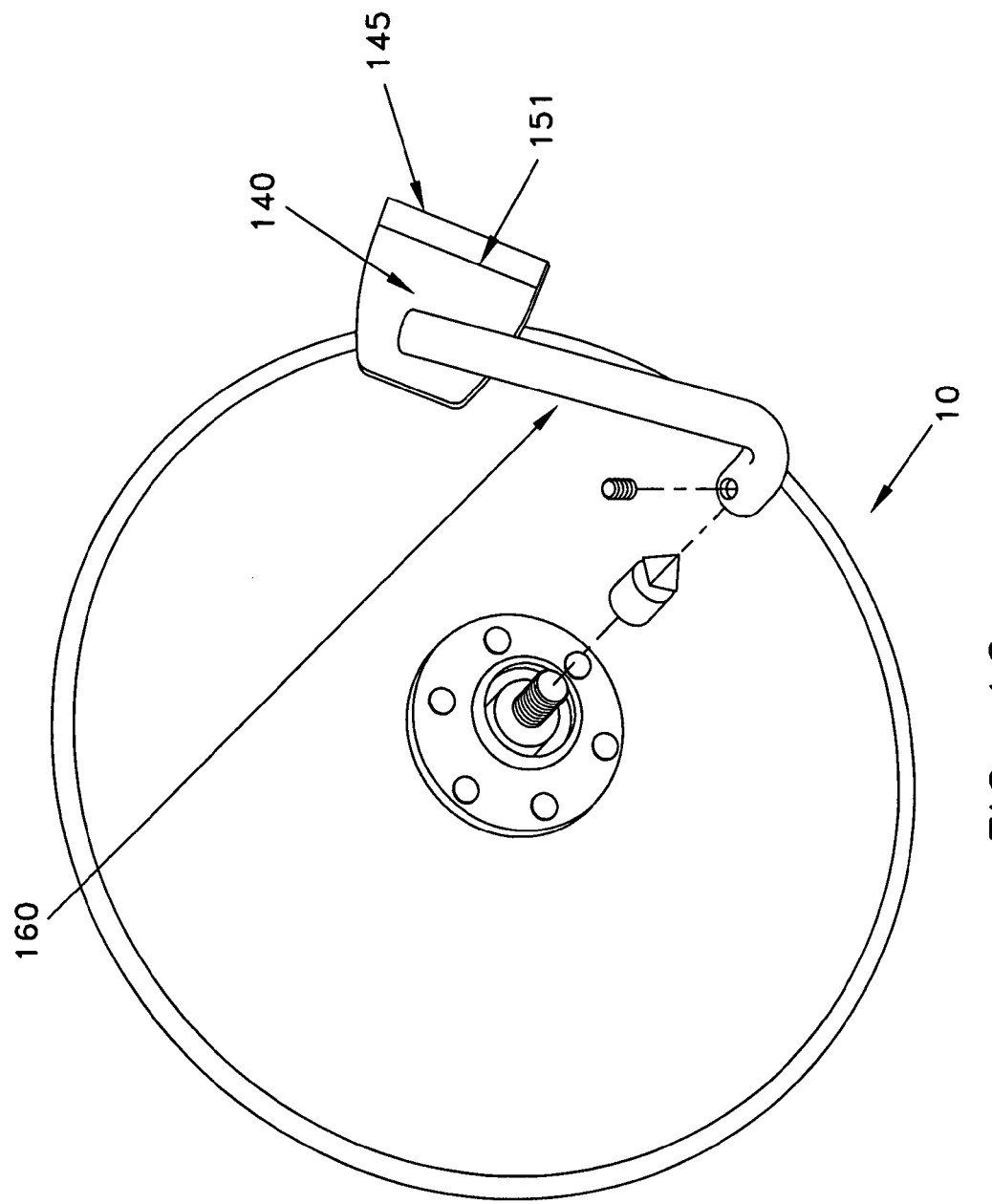
FIG. 16 is a side view showing another way of effecting the construction shown in FIG. 14.
Figure 17:
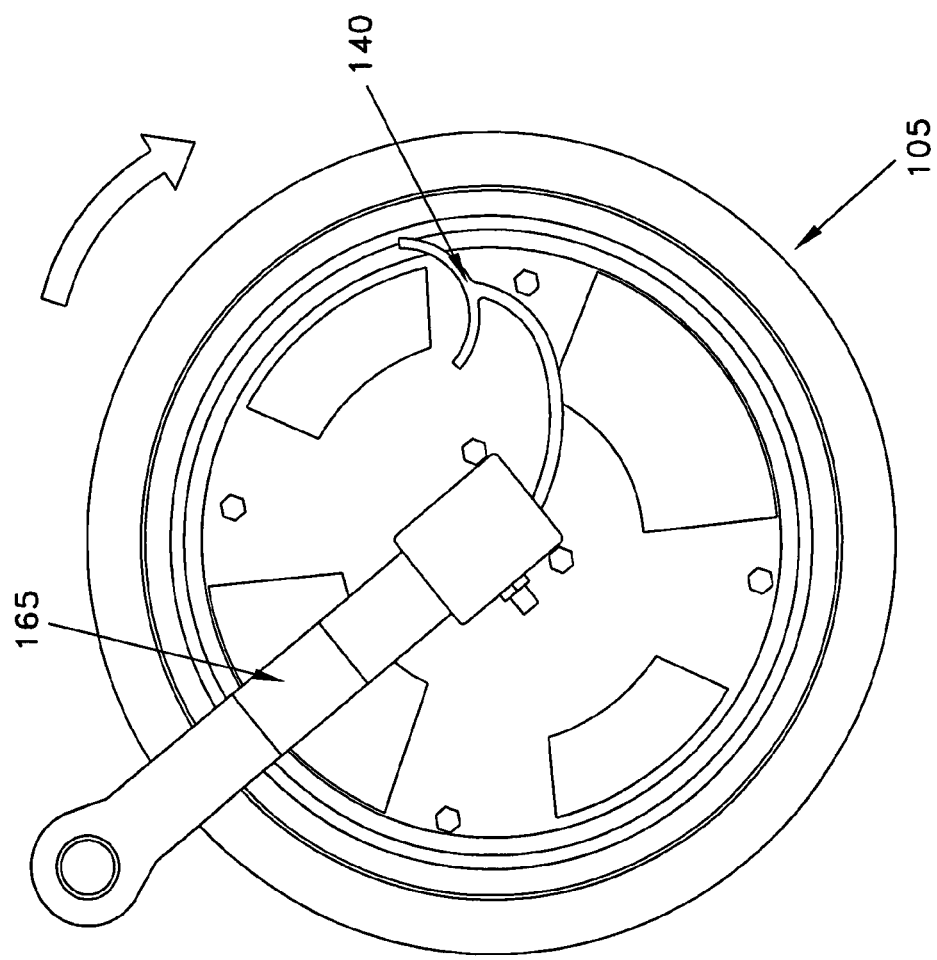
FIG. 17 is a side view showing another form of scraper, with another mounting arrangement.
Figure 18:
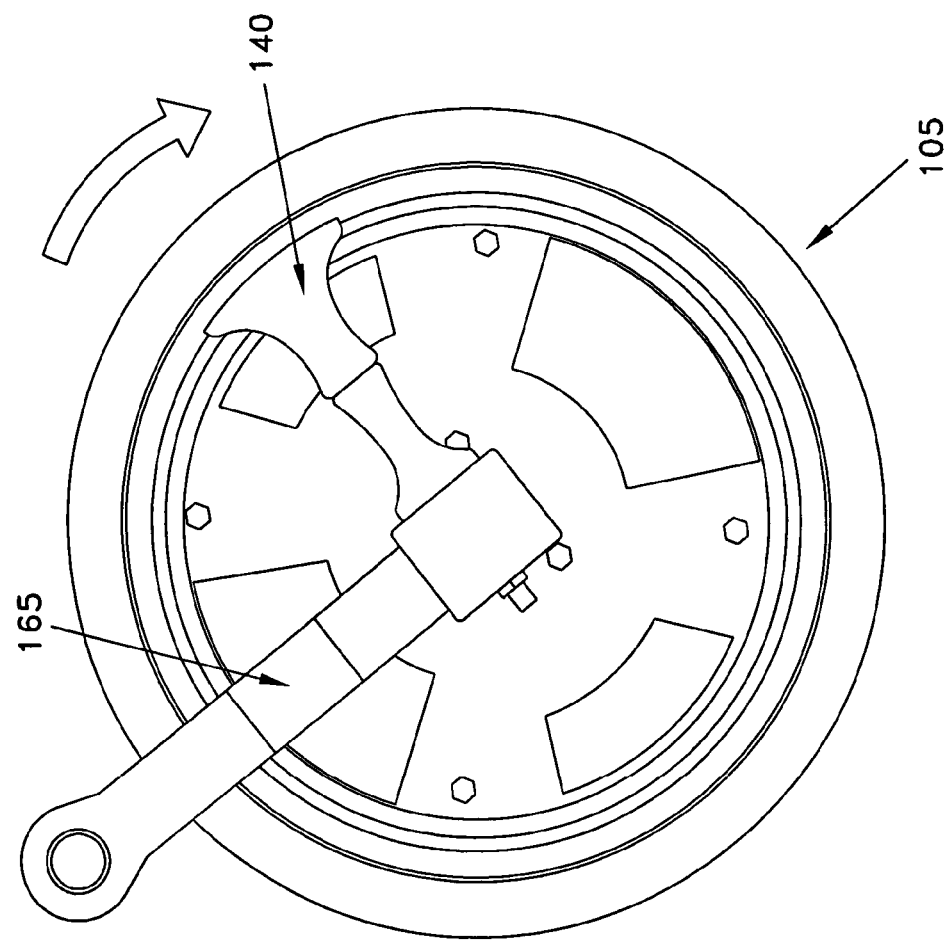
FIG. 18 is a side view showing another form of scraper, with another mounting arrangement.
Figure 19:
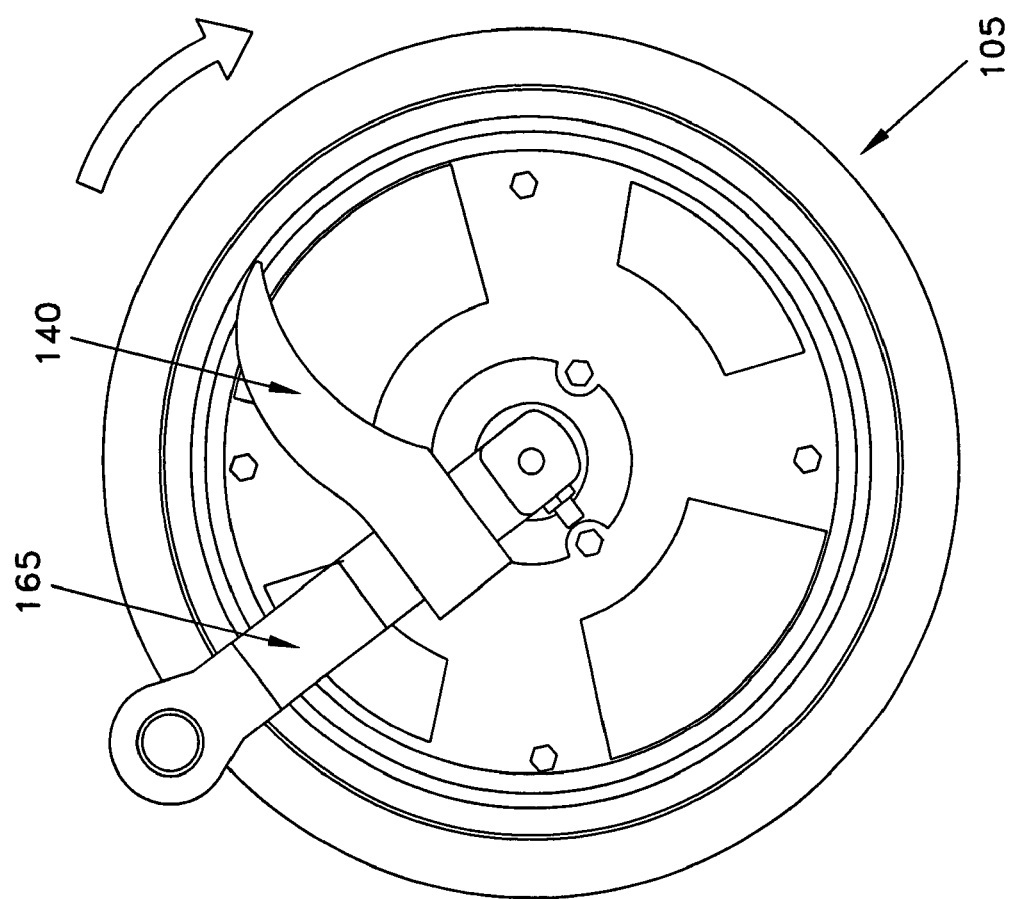
FIG. 19 is a side view showing another form of scraper, with another mounting arrangement.
Figure 20:
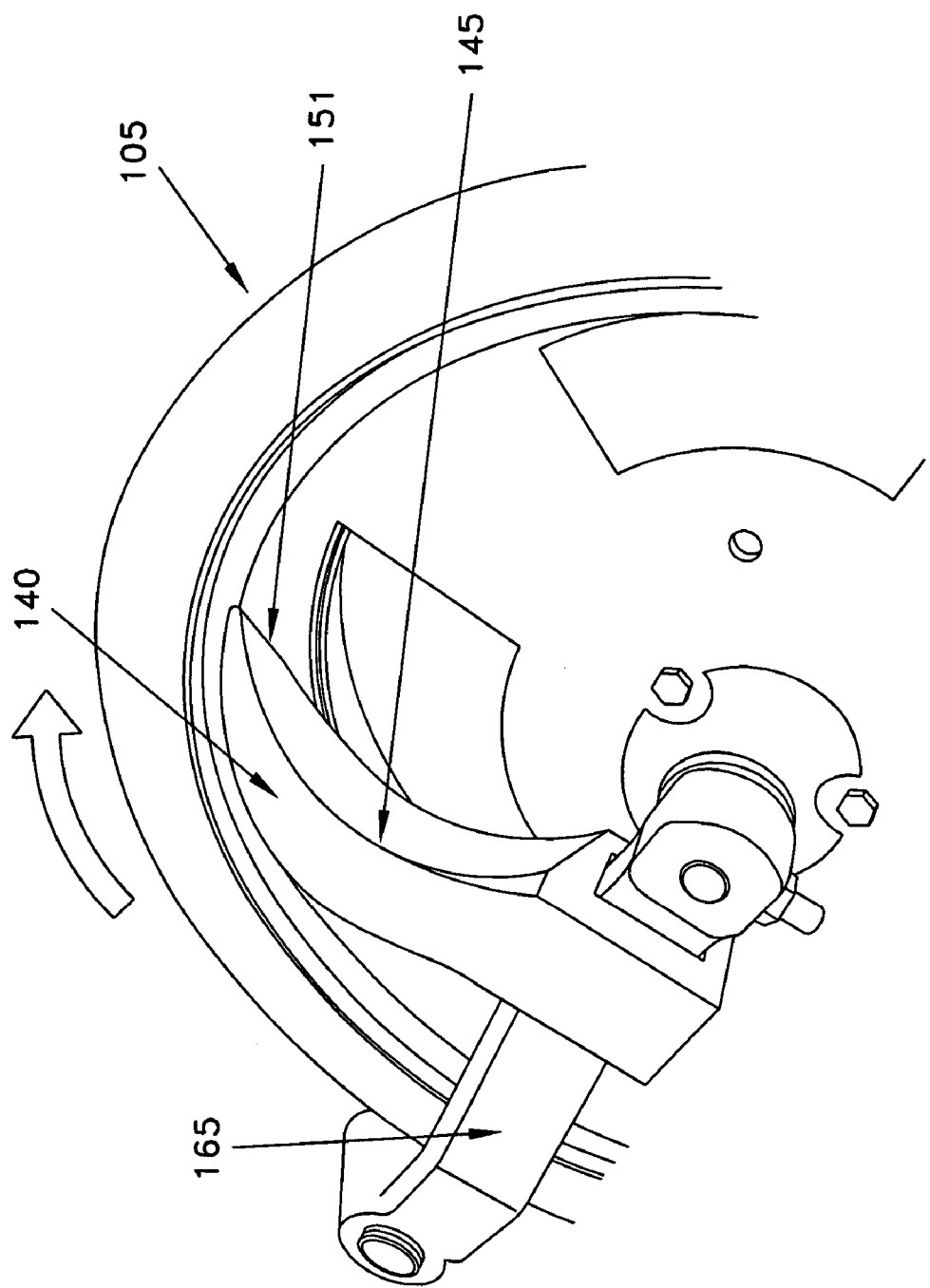
FIG. 20 is a perspective view showing further details of the construction shown in FIG. 19.

Thus, for example, and looking now at FIGS. 14-16, it will be seen that scraper 140 may be mounted to the axle of the opening disk 10 via universal scraper arm 160.

Alternatively, and looking now at FIGS. 17-20, scraper 140 may be mounted to the axle of gauge wheel 105 via universal scraper arm 165.

Wheel Liner

Figure 21:
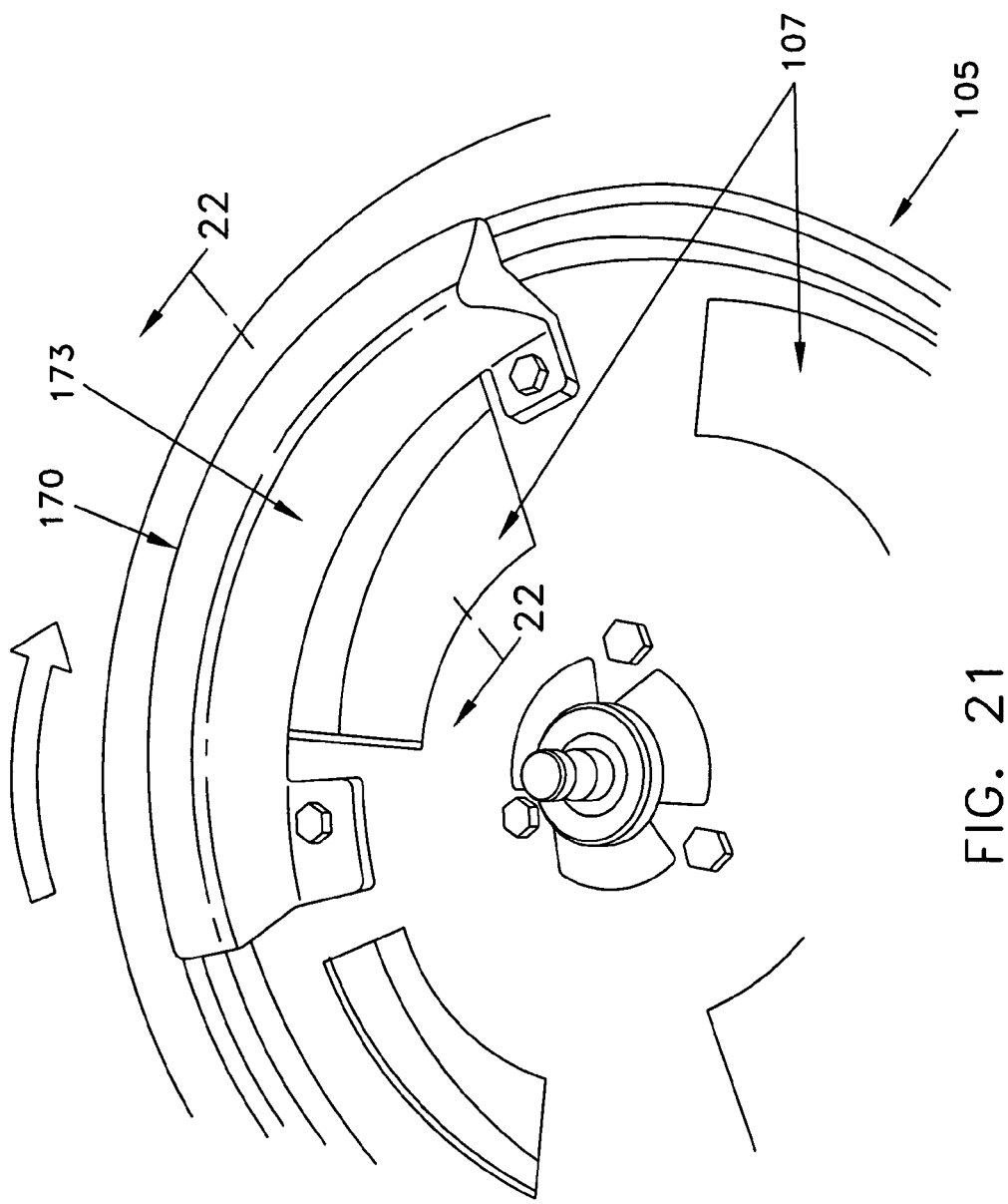
FIG. 21 is a perspective view showing a liner formed in accordance with the present invention.
Figure 22:
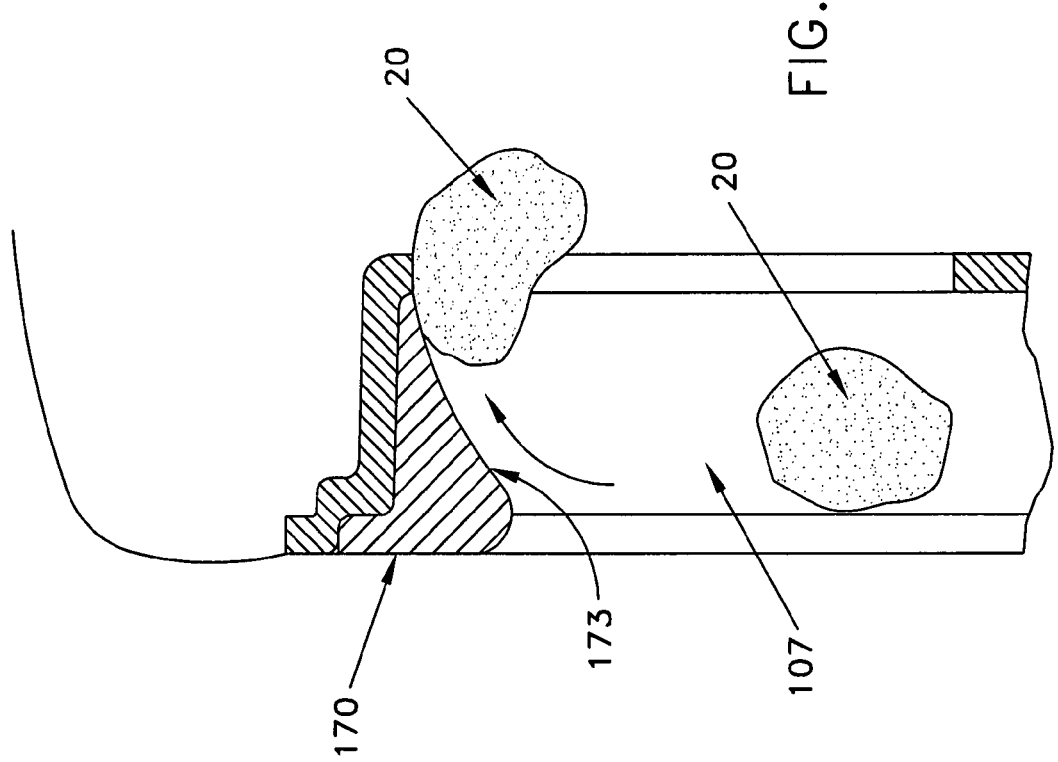
FIG. 22 is a side view in section taken along line 22-22 of FIG. 21.

In an alternate form of the present invention, and looking now at FIGS. 21 and 22, the gauge wheel 105 can be formed with a wheel liner 170. The wheel liner 170 is formed so as to generally follow the shape of the gauge wheel rim at its base, forming an inner rim. The wheel liner 170 is formed so that its inner rim surface 173 gradually slopes downward and outward from the opening disk, towards the exit openings 107 formed in the gauge wheel rim. This sloping of the inner rim surface 173 serves to facilitate egress of soil from the space between the opening disk and gauge wheel. In other words, the varying slope along the inner rim surface 173 is formed so as to create a higher bevel at the inner rim surface furthest from the openings in the gauge wheel, and a lower bevel at the inner rim surface adjacent to the openings in the gauge wheel, whereby to help channel loosened soil out openings 107. Furthermore, the body of wheel liner 170 also acts as a block to prevent the build-up of soil adjacent to openings 107.

In one preferred form of the invention, wheel liner 170 is formed so that its inner rim surface 173 is set at an angle of approximately 70 degrees or less to the plane of gauge wheel 105.

The wheel liner 170 may be formed with tabs positioned so as to align with existing bolts on the gauge wheel, whereby to facilitate affixing the wheel liner to the gauge wheel.

Alternatively, the wheel liner may be provided with a face plate. The face plate is formed with a perimeter slope molding that matches the rim face, thus covering the inner rim face and aligning with all holes formed in the rim face. The face plate includes openings which would align with the soil egress openings of the gauge wheel.

Soil Deflector

Figure 23:
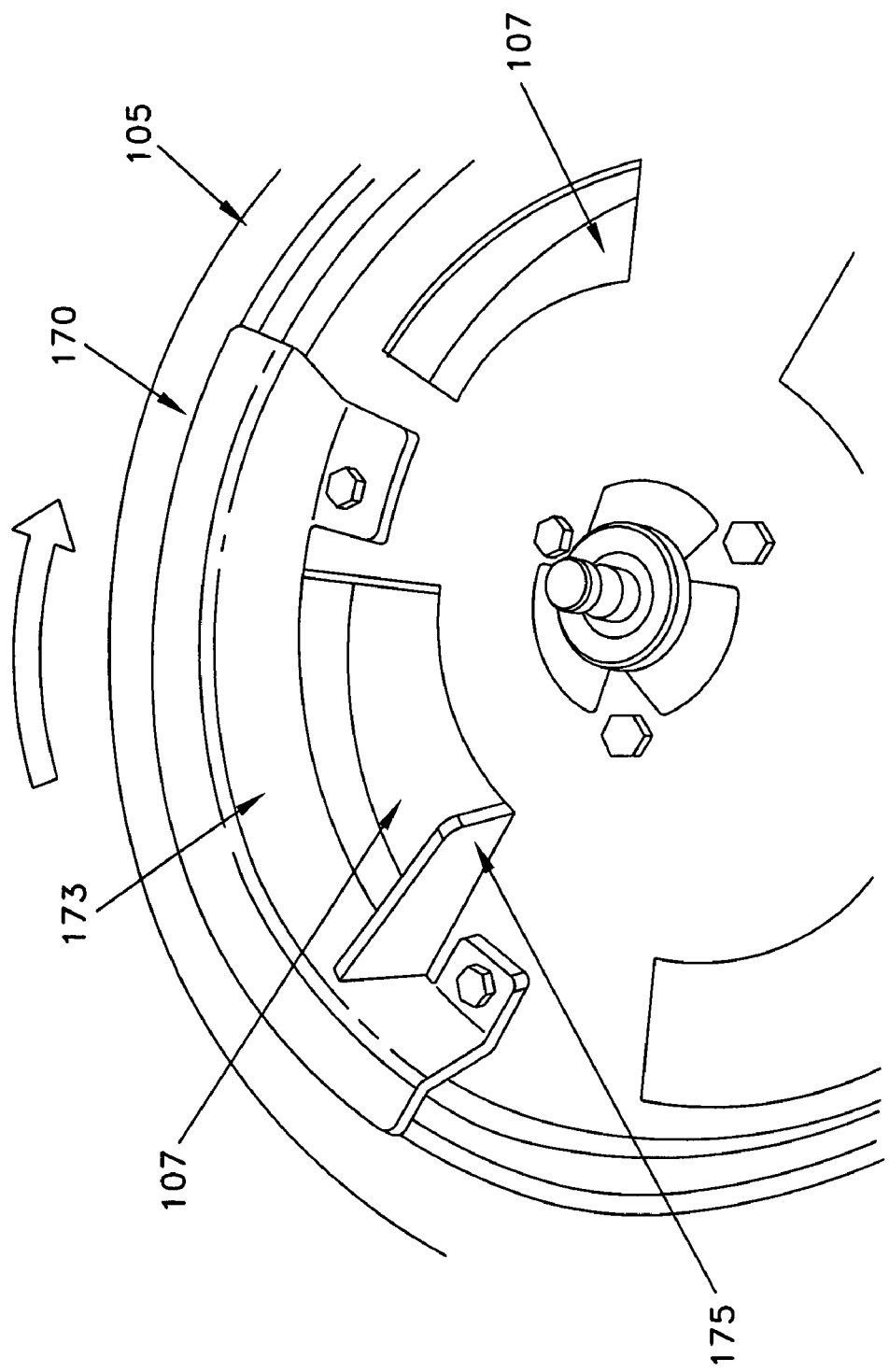
FIG. 23 is a perspective view showing a deflector formed in accordance with the present invention.

In another preferred form of the present invention, and looking now at FIG. 23, when the wheel liner or face plate is used, a soil deflector 175 may also be provided. The soil deflector 175 is positioned along the inner rim of the gauge wheel, along the vertical trailing edge of the opening in the gauge wheel. The soil deflector 175 serves as an additional means to facilitate egress of soil from the space between the opening disk and gauge wheel. Additionally, the soil deflector 175 will serve to prevent wet soil from sticking to the flat edges of the openings in the gauge wheel. The soil deflector 175 is positioned at an angle of deflection toward the gauge wheel opening 107, and may be formed out of a non-stick material. The soil deflector is attached using an adjacent existing bolt on the gauge wheel.

Soil Exit Chute

In yet another preferred construction, and looking now at FIG. 24, there is shown a soil exit chute 180 which is positioned adjacent to openings 107, whereby to facilitate egress of soil from the gap located between opening disk 10 and gauge wheel 105. More particularly, FIG. 24 shows how wet soil removed from the opening disk 10 and/or gauge wheel 105 by a scraper (e.g., scraper 140) tends to roll along the perimeter of the gauge wheel rim and, as additional soil is scraped from the opening disk and/or gauge wheel, the newly scraped soil also falls to the perimeter of the gauge wheel rim, sticking to the previously scraped soil. In other words, these soil scrapings have a tendency to stick to each other as well as to the rim of the gauge wheel (and opening disk), effectively forming soil "balls". Accordingly, the soil exit chute 180 takes advantage of this particle attraction, by providing a soil egress for guiding the soil balls out openings 107. In one preferred form of the invention, soil exit chute 180 comprises a floor 185 and a side wall 187, where floor 185 and side wall 187 are configured to move the soil balls outboard as they emerge from openings 107.

The soil exit chute 180 may be manufactured out of a non-stick plastic, or a coated metal, or a combination of the two.

Modifications

While the present invention has been described in terms of certain exemplary preferred embodiments, it will be readily understood and appreciated by those skilled in the art that it is not so limited, and that many additions, deletions and modifications may be made to the preferred embodiments discussed herein without departing from the scope of the invention.

What is claimed is:

1. A row planter assembly comprising:
    a frame;
    an opening disk rotatably mounted to the frame; and
    a gauge wheel rotatably mounted to the frame and disposed alongside, but spaced from, the opening disk so that a gap exists between the opening disk and the gauge wheel;
    wherein the gauge wheel comprises:
        a radially-extending side wall terminating in a circumferentially-extending ground contacting surface;
        wherein the circumferentially-extending ground contacting surface extends along an entirety of an outermost circumference of the gauge wheel such that the ground contacting surface contacts the ground surface;
        wherein the ground contacting surface has a uniform width along the entirety of the circumference of the gauge wheel; and
        at least one opening in the side wall thereof so as to permit soil to pass from the gap located between the opening disk and the gauge wheel to a region outside of the gauge wheel.

2. A row planter assembly according to claim 1 wherein the gauge wheel comprises a plurality of openings in the side wall thereof and each of the openings extends along at least 30% of a radius of the gauge wheel.

3. A row planter assembly according to claim 1 wherein the gauge wheel comprises a plurality of openings in the side wall thereof and each of the openings extends along at least 50 degrees of a circumference of the gauge wheel.

4. A row planter assembly according to claim 1 wherein the gauge wheel comprises two openings.

5. A row planter assembly according to claim 4 wherein the two openings are diametrically opposed from one another.

6. A row planter assembly according to claim 1 wherein the gauge wheel comprises at least one wheel liner disposed adjacent to the at least one opening, wherein the at least one wheel liner comprises an inner rim surface to facilitate the egress of soil out the at least one opening.

7. A row planter assembly according to claim 1 wherein the gauge wheel comprises at least one soil deflector disposed adjacent to the at least one opening, wherein the at least one soil deflector is positioned along a trailing edge of the at least one opening so as to facilitate the egress of soil out the at least one opening.

8. A row planter assembly according to claim 1 wherein the gauge wheel comprises at least one soil exit chute disposed adjacent to the at least one opening, wherein the at least one soil exit chute comprises a floor and a side wall configured to move soil outboard as the soil emerges from the at least one opening.

9. A row planter assembly according to claim 1 wherein the assembly further comprises a scraper disposed in the gap between the opening disk and the gauge wheel and configured to remove soil from at least one of the opening disk and the gauge wheel and direct the removed soil out the at least one opening.

10. A row planter assembly according to claim 9 wherein the scraper comprises a surface for removing soil from the opening disk.

11. A row planter assembly according to claim 9 wherein the scraper comprises a surface for removing soil from the gauge wheel.

12. A row planter assembly according to claim 9 wherein the opening disk is rotatably mounted to the frame via an axle, and further wherein the scraper is mounted to the opening disk axle.

* * * * *